Sept. 8, 1936.  E. J. KINGSBURY  2,053,399
MECHANISM FOR INTERMITTENT AND PROGRESSIVE DRILL FEEDING
Filed July 14, 1933  10 Sheets-Sheet 1

Sept. 8, 1936.  E. J. KINGSBURY  2,053,399
MECHANISM FOR INTERMITTENT AND PROGRESSIVE DRILL FEEDING
Filed July 14, 1933  10 Sheets-Sheet 2
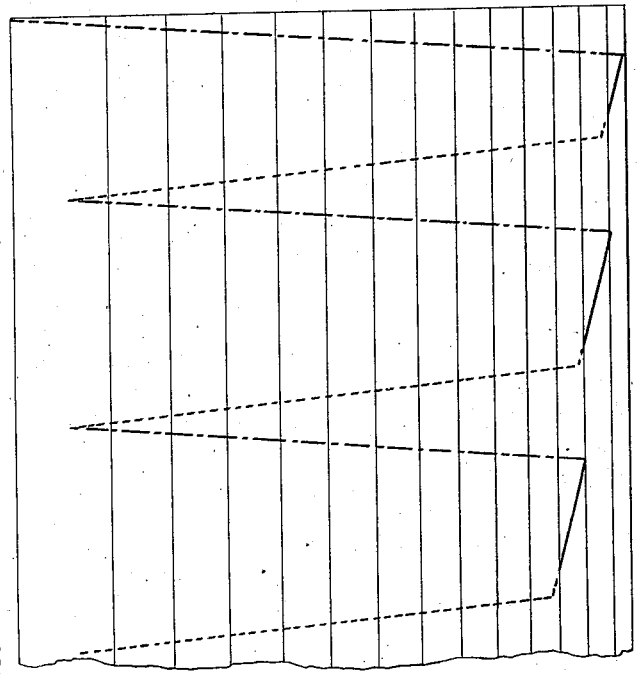
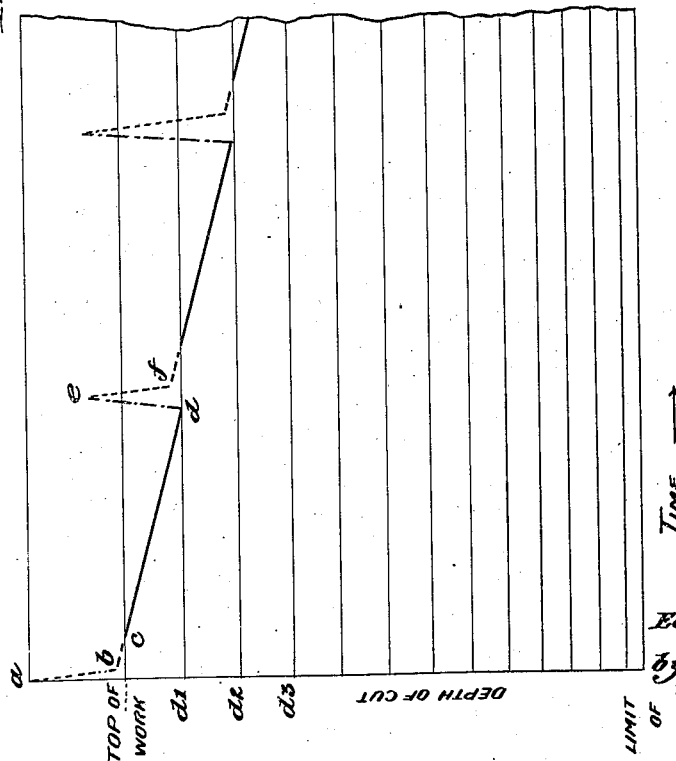
Fig. 2.
Inventor:
Edward J. Kingsbury,
by
Attys.

Sept. 8, 1936.  E. J. KINGSBURY  2,053,399
MECHANISM FOR INTERMITTENT AND PROGRESSIVE DRILL FEEDING
Filed July 14, 1933  10 Sheets-Sheet 3

Inventor:
Edward J. Kingsbury,
by
Attys.

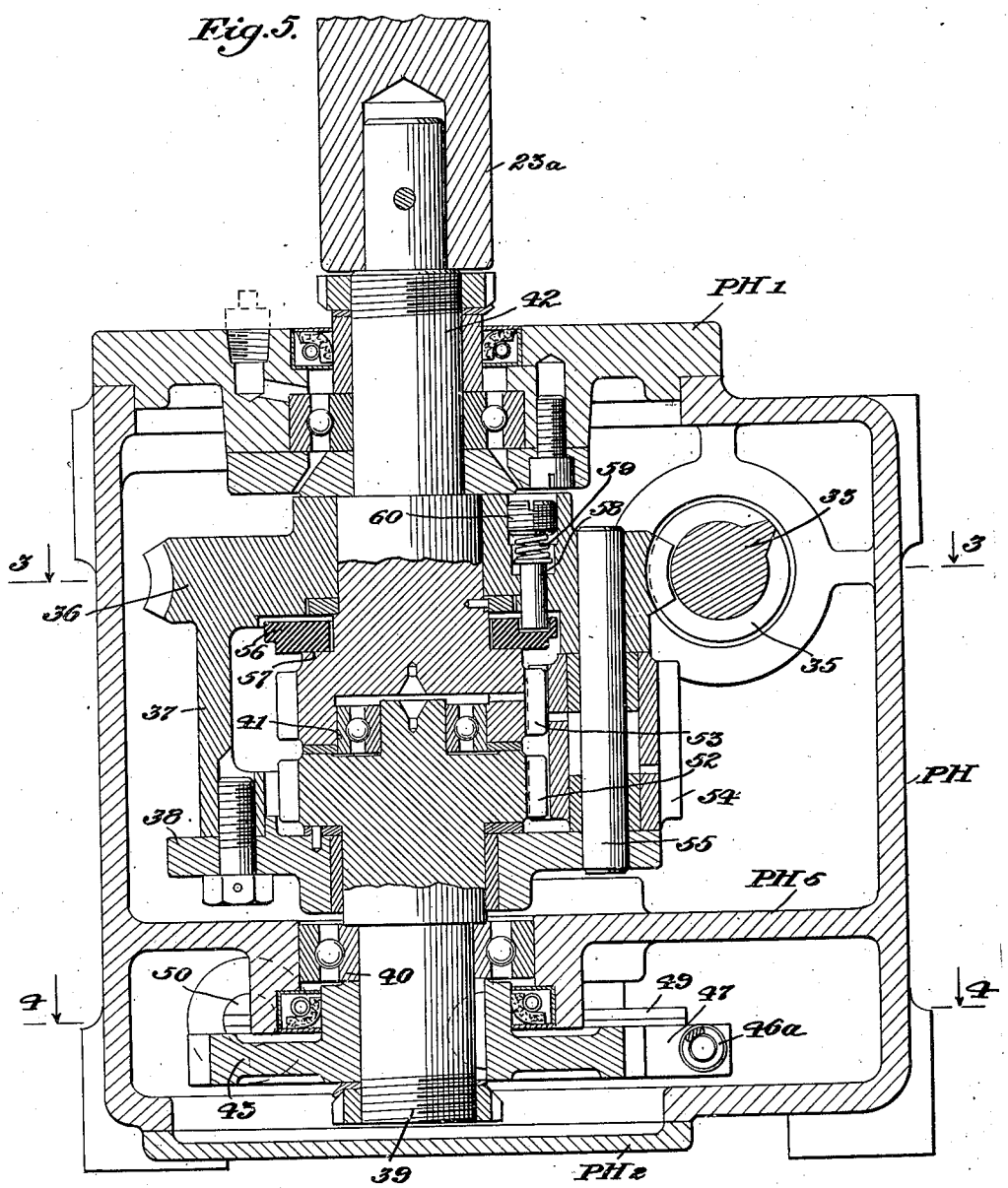

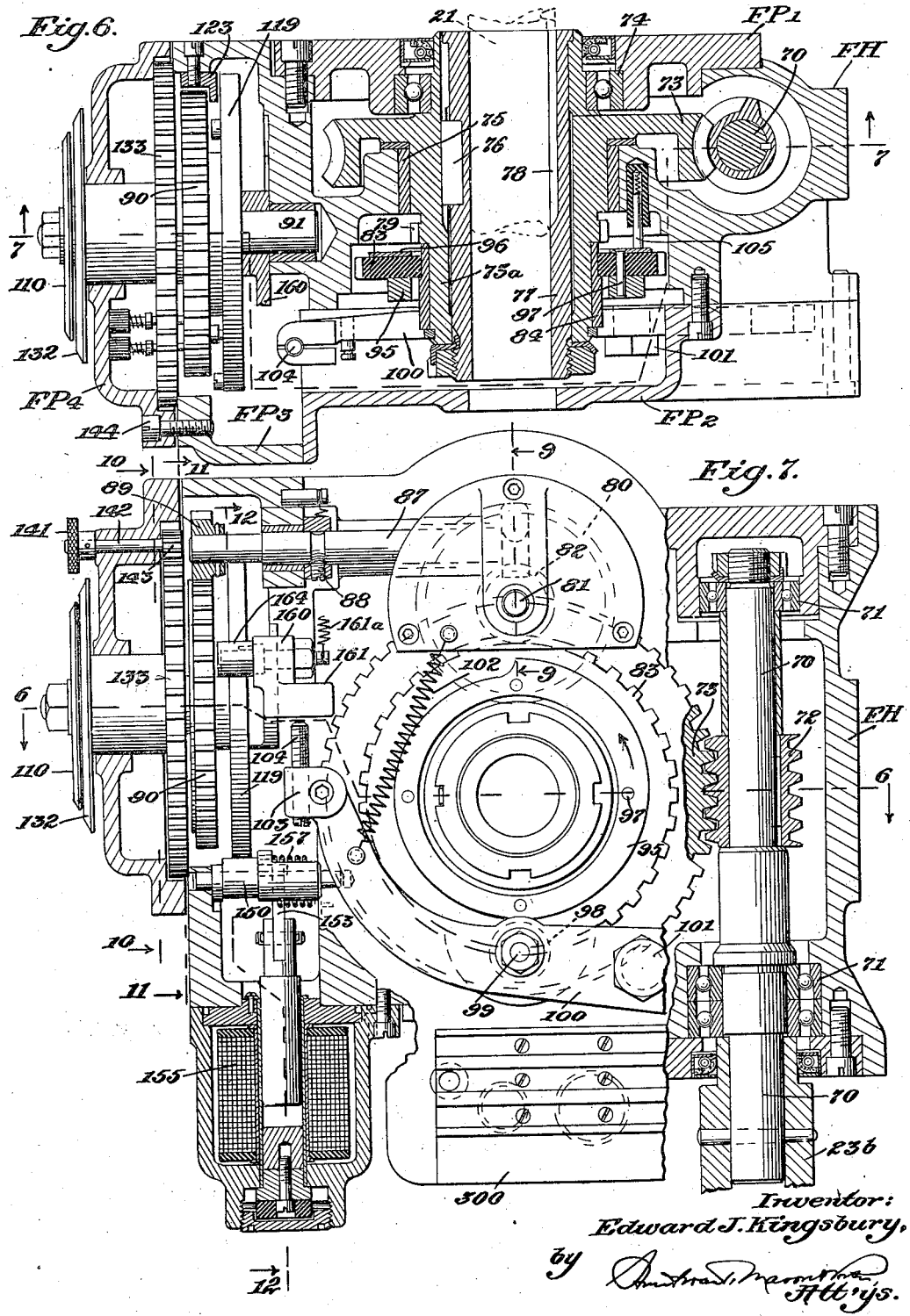

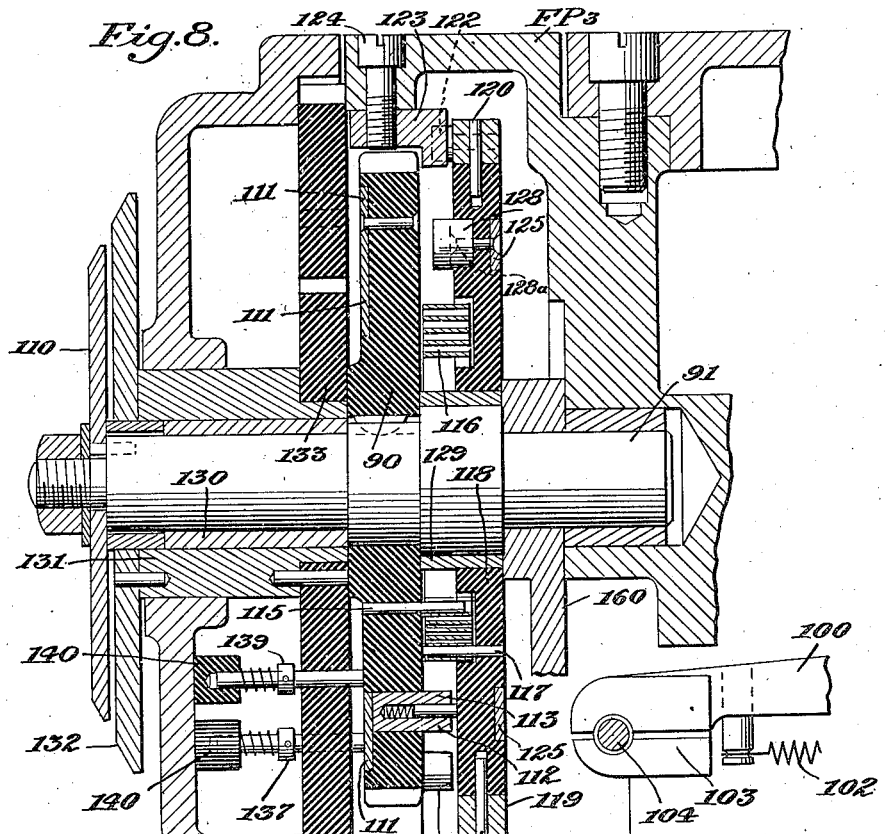
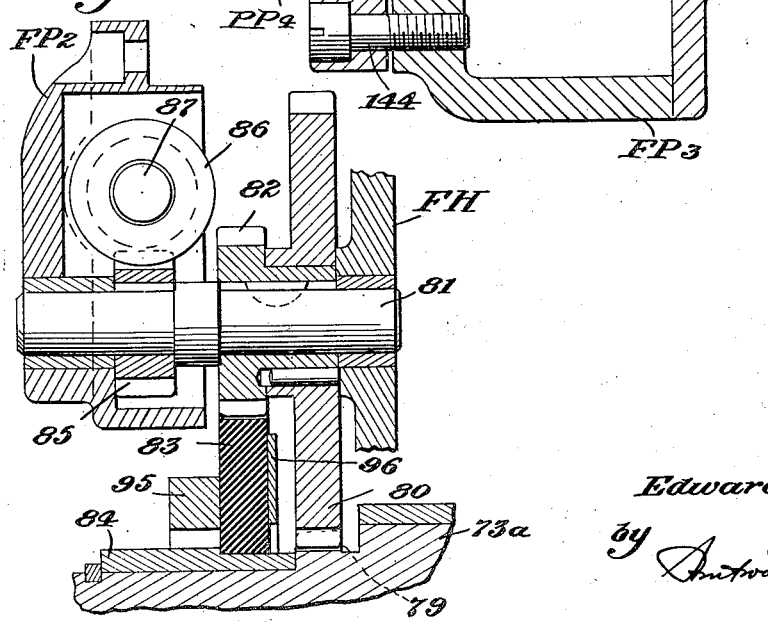
Fig. 8.
Fig. 9.
Inventor:
Edward J. Kingsbury,
by Att'ys.

Sept. 8, 1936.  E. J. KINGSBURY  2,053,399
MECHANISM FOR INTERMITTENT AND PROGRESSIVE DRILL FEEDING
Filed July 14, 1933  10 Sheets-Sheet 8
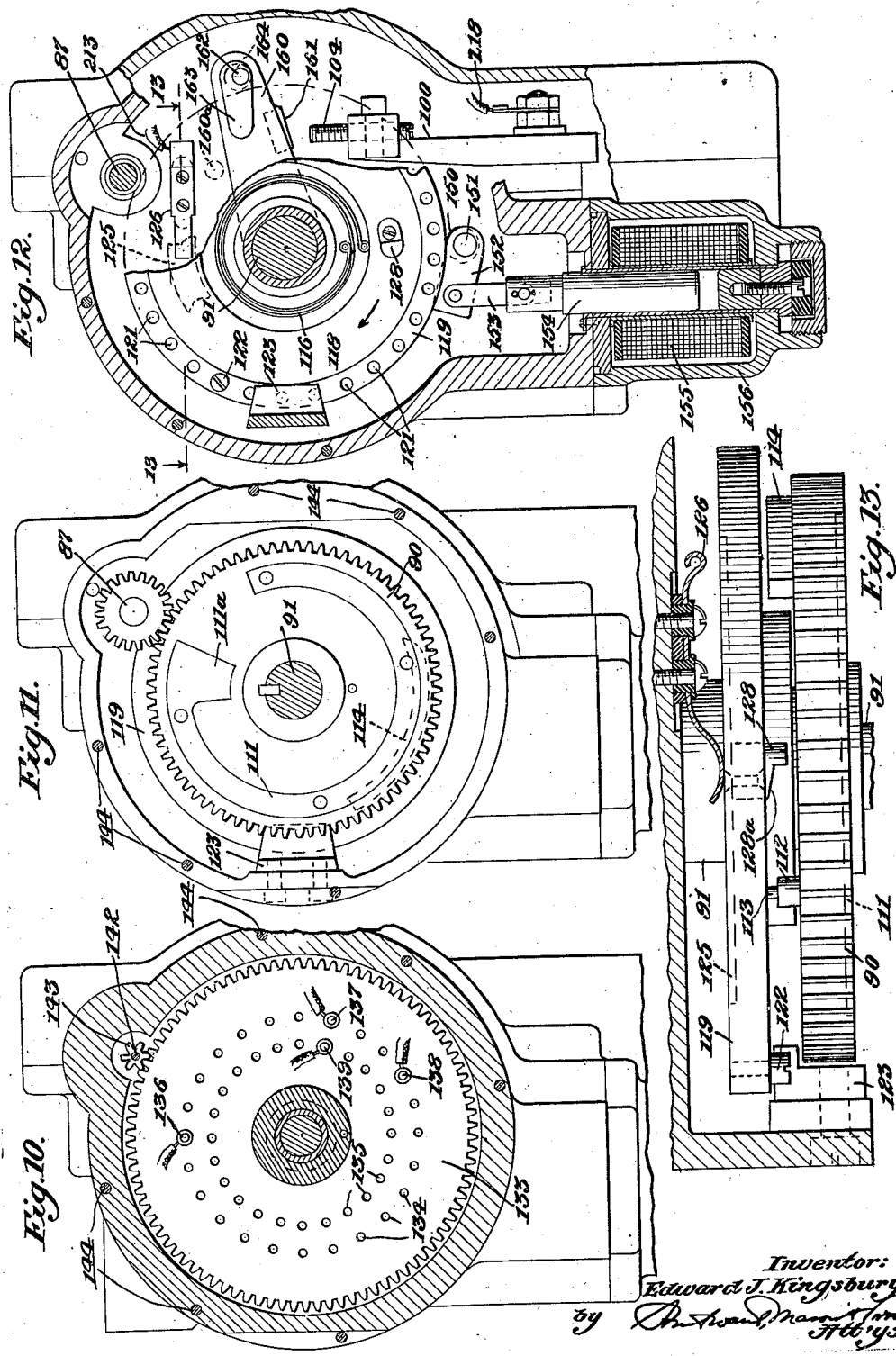

Sept. 8, 1936. E. J. KINGSBURY 2,053,399
MECHANISM FOR INTERMITTENT AND PROGRESSIVE DRILL FEEDING
Filed July 14, 1933 10 Sheets-Sheet 9
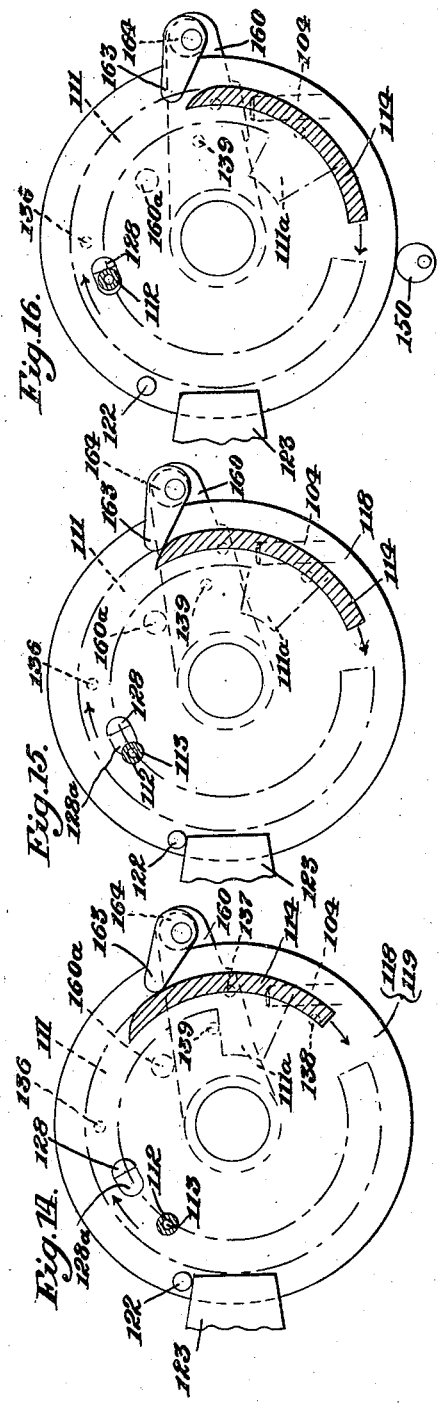
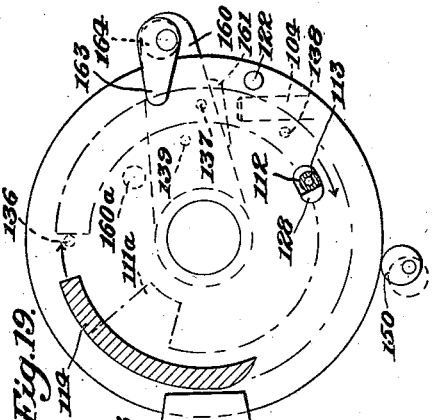
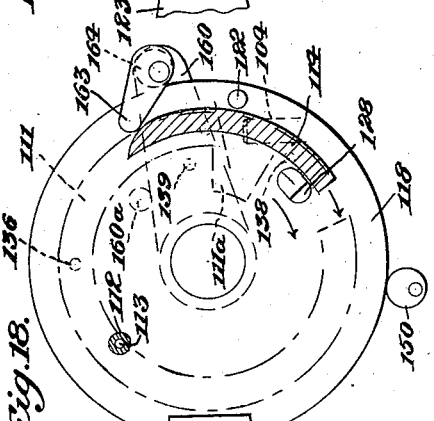
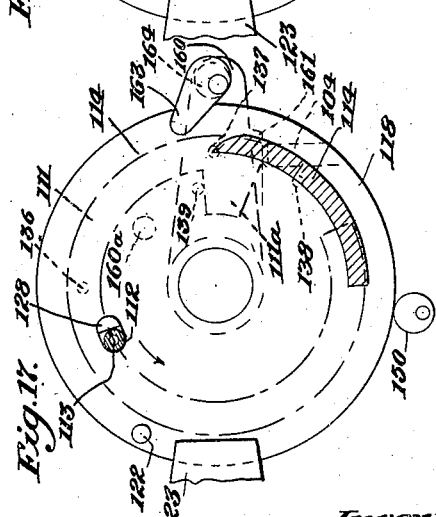
Inventor:
Edward J. Kingsbury,
by
Att'ys.

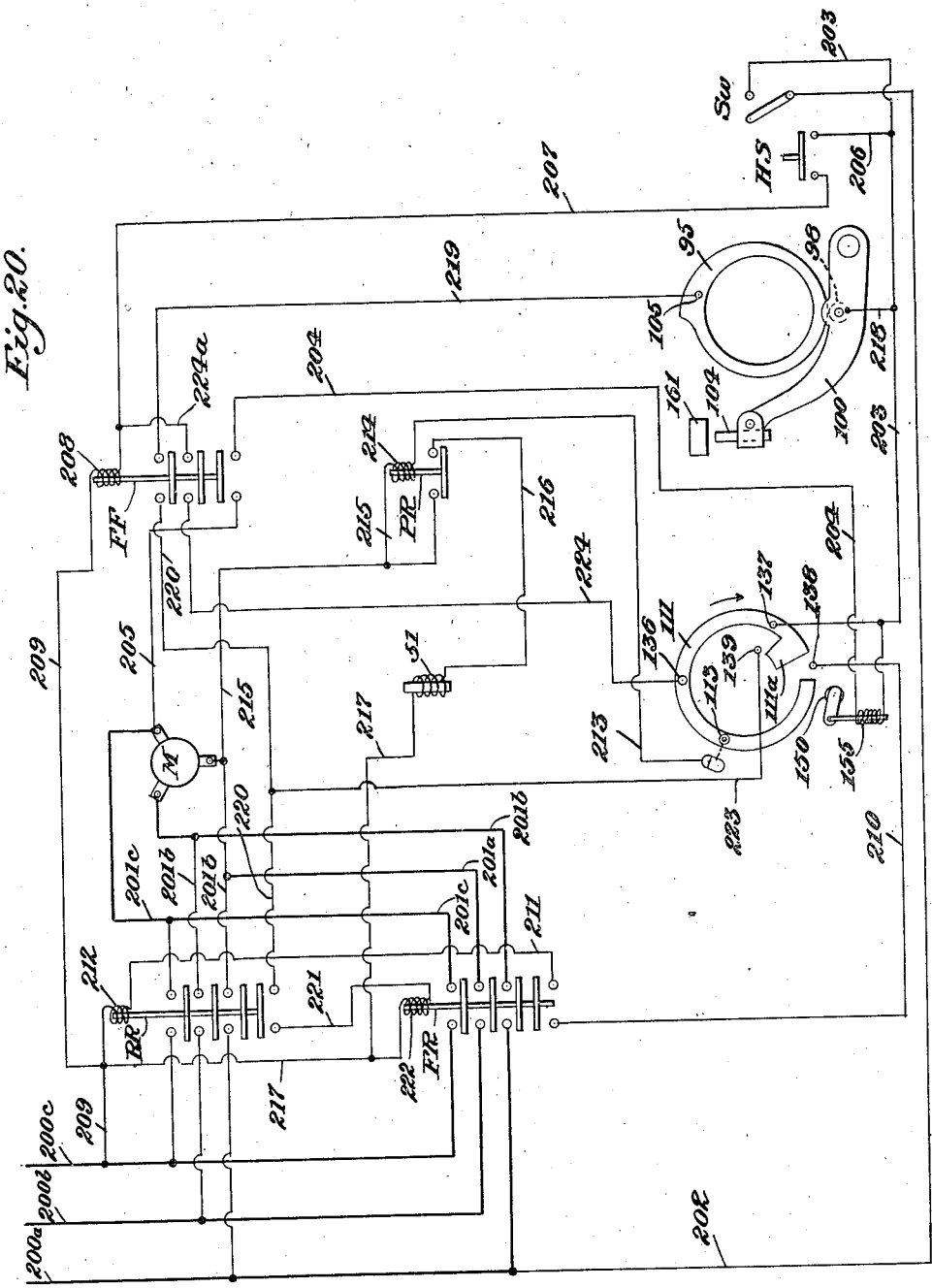

Patented Sept. 8, 1936

2,053,399

UNITED STATES PATENT OFFICE 2,053,399

MECHANISM FOR INTERMITTENT AND PROGRESSIVE DRILL FEEDING

Edward Joslin Kingsbury, Keene, N. H.

Application July 14, 1933, Serial No. 680,489

19 Claims. (Cl. 77—32)

This invention relates to an apparatus which operates by an intermittent and progressive feeding movement.

While capable of other uses, it is particularly adapted for employment in machine tools, and more especially to drill devices of horizontal and vertical type where a drilling tool is fed forward intermittently and progressively.

One of the features of the present invention relates to a control means by which the system may be shifted through a shifting of the control means, whereby an adjustment is effected, as for example, following the grinding of a drill, without any change in the distance of movements accomplished during a cycle, so that this simple movement of the control means will effect the necessary readjustment following grinding of the drill, etc.

Another feature of the present invention is the provision of means for producing an intermittent return and re-feeding of a carriage with respect to its frame, wherein each feeding movement involves a travel of the carriage to a greater distance with respect to the frame representing an increment of feeding movement, these increments being successively less in amount.

Another feature of the present invention is the provision of a control system for such a device which is simple of adjustment and compact in arrangement, and which by external indicators may reveal the position of the operating parts during the course of the cycle of movements.

Another feature of the present invention is the provision of control means for the movement of the carriage with respect to the frame, whereby the carriage starts at a withdrawn position and performs successive and intermittent progressive feeding movements, returning in each intermittent movement to a distance less than that of bringing the carriage to its initial position, with an immediate return for a further intermittent operation, followed by a final withdrawal to the initial position. In this way, the tool (as for example, a drill) is fully withdrawn from the work in the initial position, so that the work may be positioned without interference by the drill, while the intermittent withdrawals merely bring the tool out of the work a sufficient distance to clear the work of chips, etc., while the final movement removes the tool from the work for the positioning of a new piece.

Further features of the construction are apparent in the following specification and claims in conjunction with the drawings.

The accompanying drawings show by way of illustration the application of an intermittent or progressive feeding mechanism according to this invention to a vertical drill, in which the feeding mechanism is employed for feeding the drill downward to the work, and then raising it from the work. This particular embodiment is shown on the several figures of the drawings, in which:

Figure 1a is a fragmentary section on line 1a—1a of Fig. 1.

Figure 2 is a diagrammatic chart showing the operation of the feeding mechanism.

Figure 5 is a vertical sectional view along the axis of the connecting shaft, substantially on line 5—5 of Fig. 4.

Figure 6 is a horizontal sectional view of the feed control mechanism substantially on line 6—6 of Fig. 7.

Figure 7 is a corresponding vertical sectional view, substantially on lines 7—7 of Figs. 1 and 6.

Figure 8 is a horizontal axial sectional view, on a larger scale than that of Fig. 6, of the nest of gears and disks for controlling the feed.

Figure 9 is a detail sectional view, on the scale of Fig. 8, substantially on line 9—9 of Fig. 7.

Figure 1:
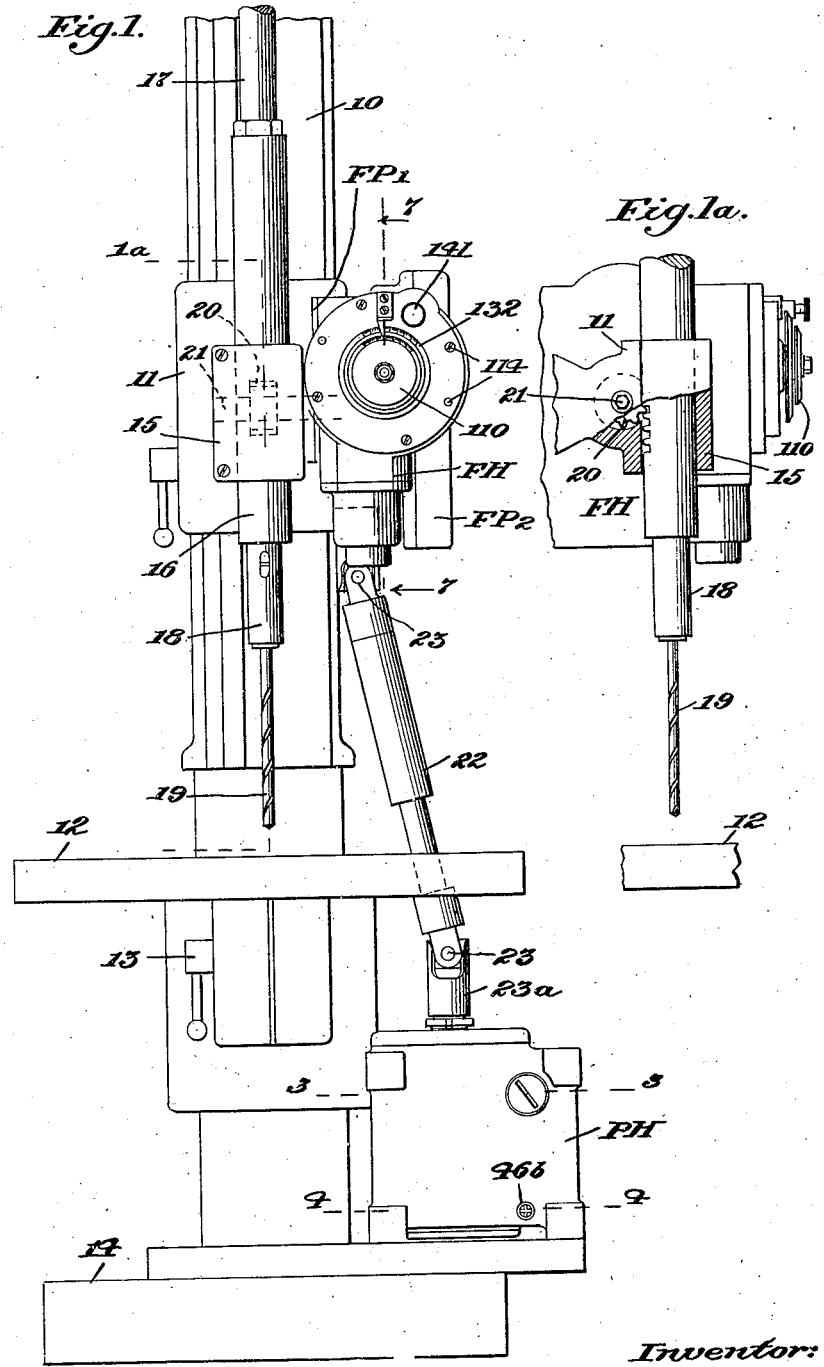
Figure 1 is a front elevation of a drill having the invention associated therewith.

Figures 10, 11 and 12 are successive vertical sectional views substantially on lines 10—10, 11—11, and 12—12 of Fig. 7.

Figure 13 is a fragmentary horizontal sectional view substantially on line 13—13 of Fig. 12, on a larger scale.

Figures 14 to 19 inclusive are diagrammatic views showing the position of the parts in the feed control nest during a cycle of operation.

Figure 20 is a circuit diagram of electrical connections.

The mechanism comprises a feed power structure which operates selectively for producing the rotation of a connecting shaft in one or the other direction, so that a slow rapid approach movement of the tool toward the work, a slow feeding movement during which the tool may operate upon the work, and then the rapid reverse movement for withdrawing the tool from the work may be successively accomplished. The connecting shaft operates a feeding structure which in turn is directly connected with a feed control system and the tool holder, so that the movements of the feed control system and of the tool holder are in unison. The feed control system selects the operation of the power structure, and is further provided with means for intermittently causing the forward feedings and then the reverse feeding of the tool holder, and also incorporates means whereby the tool holder is fed by progressively greater distances into the work, these progressively greater distances providing increments of feeding advance during which the tool operates on the work, each successive increment being preferably less than the last increment.

For this purpose, the illustrative application of the feeding mechanism to the drill, as shown in the drawings, includes the provision of a column 10 upon which is mounted a spindle and feed-control structure support 11. This structure can be secured at any desired height on the column 10. A drill table 12 is likewise supported on the column in any usual way, preferably with the inclusion of means 13 for adjusting its position and height. The column 10 is mounted on the base 14. The support 11 has a member 15 for guiding the quill 16 of the drill, the spindle 17 being rotatable in this quill and having a socket 18 at its lower end for the drill 19. It will be understood that the spindle 17 may be rotated by any desired device (not shown). This quill and spindle therefore constitute a tool holder, the quill being provided with rack teeth for engagement by the feeding pinion 20 which is mounted on a shaft 21 extending into the general feed unit housing FH. A power unit housing PH is attached to the general support 14 and is connected with the feed unit by a connecting shaft 22 preferably with telescoping parts for permitting the relative upward and downward movement of the feed unit housing FH along the column 10, and with universal joints 23.

Figure 3:
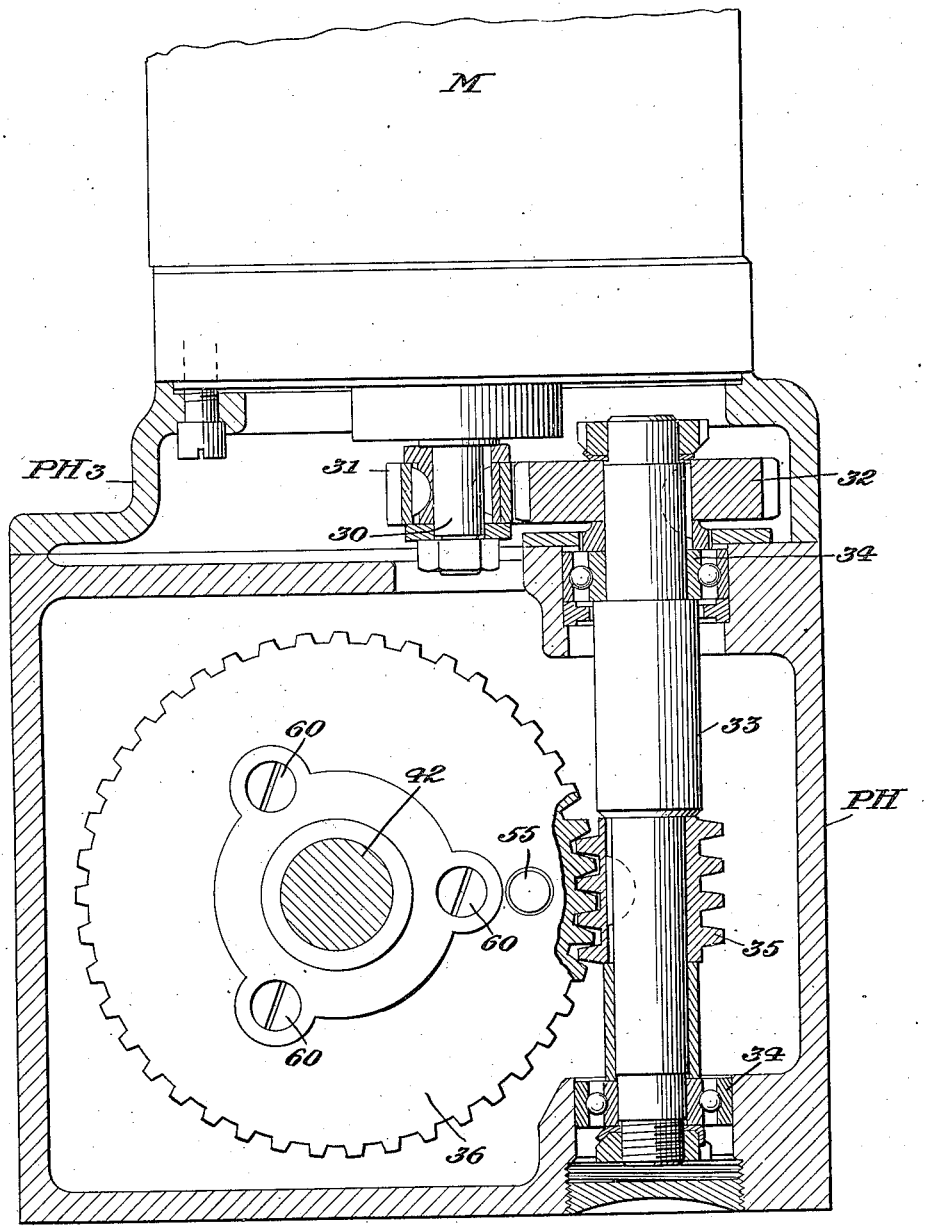
Figure 3 is a horizontal sectional view, on a larger scale, through the power supply unit, substantially on lines 3—3 of Figs. 1 and 5.
Figure 4:
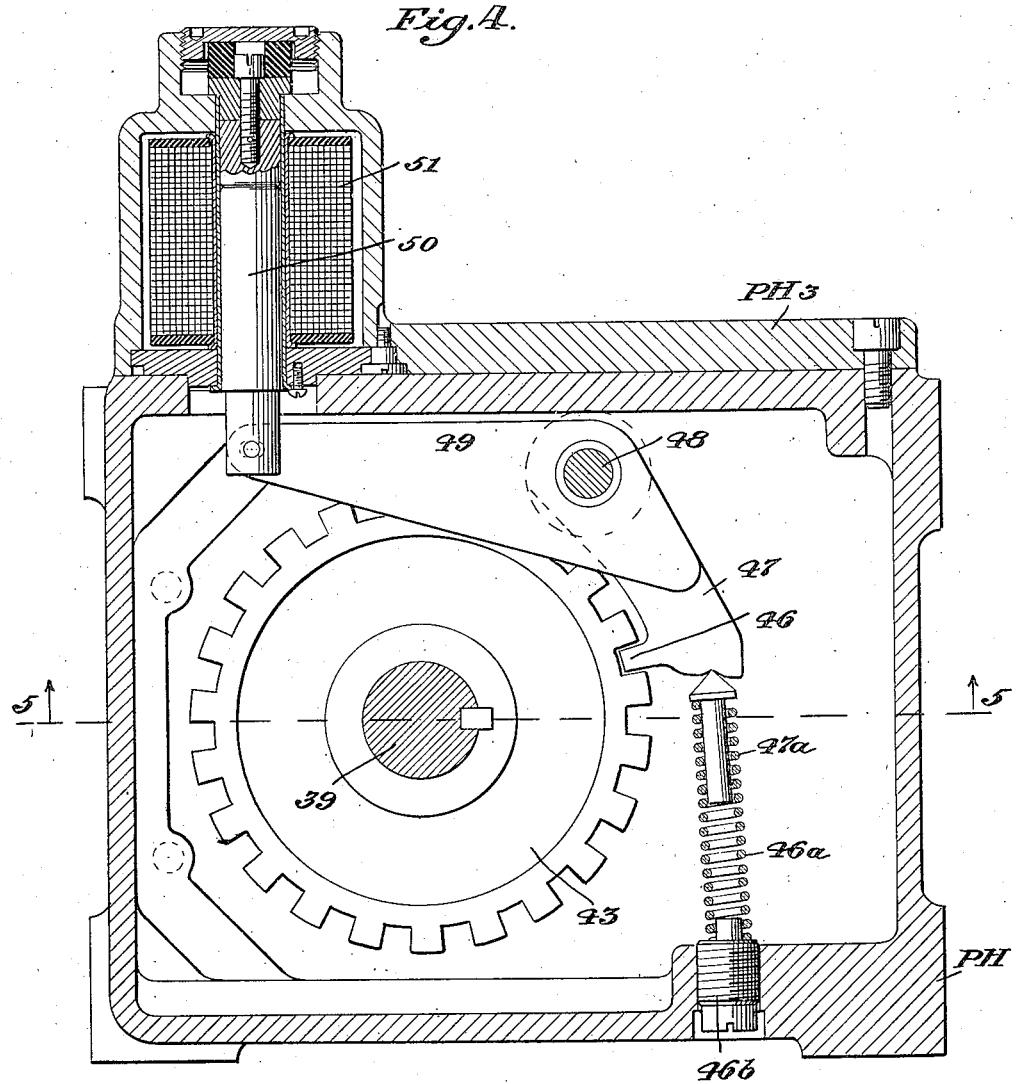
Figure 4 is a similar horizontal sectional view, substantially on lines 4—4 of Figs. 1 and 5.

The power structure is shown in detail in Figs. 3, 4 and 5. The general housing PH is provided with a top closing plate PH1, a bottom closing plate PH2, and a rear plate PH3. Supported by this rear plate PH3 (Fig. 3) is a feed motor M having a shaft 30 extending toward the main housing PH and having a small gear 31 keyed thereto and in mesh with a larger gear 32 on the power structure driving shaft 33 which is preferably supported by anti-friction bearings 34 in the general housing PH, and having a worm 35. This worm 35 is in mesh with a worm wheel 36 forming part of epicyclic gearing cage 37 which is closed at its bottom by the plate 38. Coaxial with the cage 37 is a first vertical shaft 39 which is supported in part by an anti-friction bearing 40 carried by a central web PH5 of the general housing PH (Fig. 5), and in part by an anti-friction bearing 41 which supports its upper reduced end in proper axial relationship to the second vertical shaft 42.

The first vertical shaft 39 is provided below the web PH5 with a cogged locking disk 43 (Figs. 4 and 5) which may be engaged by the finger 46 of a locking arm 47 connected to a rock shaft 48 which is also connected to a control arm 49 having a plunger armature 50 pivoted at its free end. This plunger armature (Fig. 4) may be attracted by the solenoid coil 51 of the control system, when energized in the manner described hereinafter, and thus serves to rock the arms 49 and 47 and engage finger 46 in the cogged disk 43 to hold the latter stationary.

When the solenoid 51 is de-energized, a return spring 46a operates through the plunger 47a to disengage finger 46 from the cogged wheel 43. The stress in spring 46a may be regulated from the exterior by an adjusting screw 46b.

Above the web PH5, the first vertical shaft 39 is provided with gear teeth 52 within the cage 37. The second vertical shaft 42 is similarly provided with gear teeth 53 within this cage. Both sets of teeth 52 and 53 are in mesh with the teeth on a pinion 54 mounted for free rotation about a spindle 55 carried by the cage.

A friction plate 56 loosely surrounds a portion of the second vertical shaft 42, within the cage 37, but bears frictionally against a shoulder surface 57 on this shaft. The friction member 56 is held in such frictional contact by the plunger pins 58 which are received in recesses of the upper surface of the friction member 56, and are guided in apertures through the worm wheel 36 (Fig. 5), and are urged downwardly by springs 59 which are adjusted by the screws 60.

The upper end of the second vertical shaft 42 is illustrated as pinned to the sleeve 23a of the lower universal joint 23 (Fig. 1) of the connecting shaft 22.

The feed structure includes means for operatively associating the connecting shaft 22 and the feed pinion shaft 21 and its feed pinion 20, and for driving in unison therewith the feed control devices. This feed unit includes a general housing FH having an inner face plate FP1 (to the left in Fig. 1 and thus adjacent the quill 16), an outer face plate FP2, an end plate FP3, and an end cap FP4.

The sleeve 23b of the upper universal joint 23 of the connecting shaft 22 is pinned to the feed unit driving shaft 70 which is mounted by anti-friction bearings 71 in the general housing FH and has a worm 72 thereon in mesh with a worm wheel 73 constituting a part of a sleeve structure which is supported by an anti-friction bearing 74 in the inner face plate FP1, and by a plain bearing bushing 75 in the central web constituting a part of the general housing FH (Fig. 6). A key 76 connects the sleeve to a bushing 77 having a keyway 78 by which it may be keyed to the feed pinion spindle 21 shown in dotted lines in Fig. 6.

This sleeve also has gear teeth 79 thereon (Figs. 6 and 9) which are in mesh with the teeth of a gear 80 keyed to a countershaft 81 which is journaled in the central web of the general housing FH in the face plate FP2. A second gear 82 on shaft 81 is in mesh with the peripheral teeth of the gear 83 preferably formed of insulating material and mounted for free rotation about a bearing sleeve 84 on the periphery of the sleeve 73a.

The shaft 81 also has a small skew gear 85 keyed thereto and in mesh with a skew gear 86 keyed to the cross shaft 87 (Figs. 7 and 9) which is journaled in the general housing and is held against axial movement by a screw 88 engaged in a peripheral groove thereof (Fig. 7) and has keyed thereto, at its left-hand end in Fig. 7, a gear 89 which meshes with a gear 90 in the feed control nest, and keyed to the spindle 91 (Fig. 8) of this nest.

The gears 83 and 90 are thus rotated in unison, both forwardly and backwardly, and preferably are rotated through equal angles for a given movement of the drill 19: this being accomplished by the ratios of the gear teeth and gears 79, 80, 82, 83, 85, 86, 89 and 90.

The gear 83 is of insulating material and carries an annular cam member 95 on one face thereof, and a contact ring 96 on the other face thereof. Pins 97 hold the contact ring and cam member in rigid relationship to the gear 83 at all times. The cam member has a conformation substantially as indicated in Fig. 7.

Cooperating with this cam member is a roller 98 journaled on a stub shaft 99 carried by a rock arm 100 mounted on a fixed pivot 101 on the housing FH. The arm is normally drawn upwardly by a spring 102. The free or left-hand and upper end of this arm (Fig. 7) includes clamp pieces 103 which receive an abutment screw 104. A contact brush 105 bears constantly on contact ring 96 and permits the supply of current to this ring and thus to the cam member 95, regardless of the angular position of the gear 83 and associated parts. This brush 105 is insulatedly mounted in the general feed unit housing FH.

The feed control nest includes the central spindle 91 which is keyed to the gear 90 and which has a small external dial 110 also keyed thereto so that the position of the dial reproduces externally the position of the gear 90. This gear 90 is of insulating material and has a feed control contact sector 111 (Figs. 8 and 11) mounted thereon. As shown in Fig. 11, this contact sector has a major portion extending peripherally through an angle of substantially 315 degrees. At one end of this major portion is an inward extension 111a having a peripheral angle of substantially 30 degrees. A hollow driving pin 112 is mounted in the gear 90 in electrical association with the contact sector 111 (Fig. 8) and is provided with an axial cavity to receive a contact brush 113 which is urged toward the right in Fig. 8 by a spring. The gear 90 is also provided with a releasing cam piece 114 at its periphery. A pin 115 of gear 90 is engaged with one end of a spiral spring 116 having its other end connected to a pin 117 mounted in a feed control disk 118 which likewise is of insulating material with respect to its inner portion, but preferably is provided with a wear resisting outer ring 119 of metal which is held for movement with the inner portion 117 by pins 120. This wear resisting ring 119 (Fig. 12) is provided with a plurality of threaded axially directed apertures 121 located adjacent its periphery for selectively receiving a stop screw 122. A fixed stop member 123 is secured to the end plate FP3 by screws 124 and cooperates with the stop screw 122 to limit the rotational movement of feed control disk 118—119.

The insulated portion 118 of the feed control disk supports an annular contact ring 125 which is engaged at all times by a contact brush 126 (Figs. 12 and 13) insulatedly mounted on the feed unit housing FH. The feed control disk 118 also supports an electric contact and mechanical driving member 128 which is electrically connected to the conductive ring 125 (Fig. 8), and preferably has the shape shown in Figs. 13 and 14, as having a high portion extending away from the plane of disk 118 toward gear 90, and a low portion forming a ramp 128a extending from this surface. The contact member 128 is mounted at the same radius from the axis of shaft 91 as the hollow driving pin 112 and its brush 113. Hence the brush 113 will make electrical contact with the ramp surface 128a before the hollow driving pin 112 encounters the high portion of electric contact member 128.

Contact disk 118 is mounted for free rotation about a sleeve 129 surrounding shaft 91.

A further sleeve 130 around the left-hand end of shaft 91 (Fig. 8) permits free rotation of a bushing 131 to which is pinned a large external dial 132 and an internal gear 133. The position of dial 132 thus indicates the position of gear 133. Gear 133 is provided with two peripheral rows of holes comprising an outer row 134 and an inner row 135. The outer row of holes 134 is in alignment with the major portion 111 of the contact sector on gear 90, while the inner row of holes 135 is in alignment with the inward extension 111a thereof. Three brushes 136, 137 and 138 are located in the outer row of holes at angular distances determined by the operation to be accomplished. A single brush 139 is likewise positioned in a properly selected inner hole. As shown in Fig. 8, each of these brushes may comprise a stem portion guided in the gear 133, a collar, a pressure spring for forcing the brush toward gear 90, and an insulating heel piece 140 which bears against the smooth internal surface of the end cap FP4, so that the gear 133 may be rotated without changing the relative position of the brushes 136—139 with respect to one another. This rotation of the gear 133 may be accomplished from the exterior by rotating the knob 141 (Figs. 1 and 7) which is pinned to a shaft 142 having a pinion 143 thereon in mesh with a gear 133. The end cap FP4 is preferably held in position by screws 144. The gear 133 extends between opposed surfaces of the end plate FP3 and end cap FP4 (Fig. 8) so that upon tightening the screws 144, the gear 133 is held in position by a frictional resistance dependent upon the adjustment of screws 144.

The metal wear ring 119 of the feed control disk 118 is engaged by an eccentric locking cam 150 (Figs. 7 and 12), mounted on a shaft 151 which has a crank arm 152 pivoted to a link 153 and thus connected to the plunger 154 actuated by a resetting solenoid 155 carried by a housing 156 connected to the bottom of the housing structure. A torsion spring 157 operates to hold the cam surface 150 engaged with the wear ring 119, for cooperation therewith as a retaining pawl.

Also mounted on the feed control nest shaft 91 is an arm 160 having a pad piece 161 for engaging the adjustable screw 104 of the feed control lever 100 (Figs. 7 and 12). This arm 160 also carries a rockable shaft 162 having an arm 163 for engagement with the release cam 114, and also a cam 164 (Figs. 7, 12, 14–18) operating as an advancing pawl upon the wear ring 119.

The electrical connections may be as illustrated in Fig. 20. The feed motor M is illustrated as of three-phase type for supply by the three-phase conductors 200a, 200b, 200c, which are connected to contacts under the control of the bridges of a reverse relay RR and a forward relay FR, so that as these relays are selectively closed, current is delivered through the motor supply conductors 201a, 201b, 201c, the connection of conductors 201a and 201b being reversed in the two relays, whereby to secure opposite rotation of the feeding motor M accordingly as one or the other relay is closed, in the usual way.

A main feed control conductor 202 is connected to phase conductor 200a and thence through a main control switch SW to the control conductor 203, which is connected to brush 137 engaged with the major portion of sector 111 and to resetting solenoid coil 155, and thence by conductor 204 to a contact controlled by the forward feed relay FF and thence, when this relay is de-energized, by a return conductor 205 back to a motor conductor 201c. A branch conductor 206 from conductor 203 leads to a hand-starting switch HS and thence by conductor 207 through the coil 208 of forward feeding relay FF and thence by conductor 209 to phase conductor 200c. The brush 138 is connected by a conductor 210 with a contact of the bridge in forward relay FR which is closed when the relay is de-energized, and thence by conductor 211 to the coil 212 of the reverse relay RR, and thence by conductor 209 back to the phase conductor 200c. Brush 126 is connected by conductor 213 with the coil 214 of the pilot relay PR and thence by conductor 215 with the motor conductor 201a. The pilot relay PR controls the bridge which closes a circuit when the pilot PR is de-energized, extending from conductor 215 and by conductor 216, solenoid 51 which actuates the feed control finger 46 (Fig. 4), and thence by conductors 217 and 209 back to phase conductor 200c.

The control circuit for the reverse relay extends from conductor 203 by conductor 218, the contact roller 98, the conductive cam 95, and thence to brush 105 and by conductor 219, contacts of the feeding relay FF which are closed when the relay is energized, and thence by conductor 220, contacts in reverse relay RR which are closed when the relay is de-energized, conductor 221, coil 222 of the forward relay FR, with a return by conductors 217 and 209 to phase conductor 200c.

Brush 139 is connected by conductor 223 with conductor 220.

Brush 136 is connected by a conductor 224 with contacts of forward feeding relay FF which are closed when the relay is energized, and thence by conductor 224a to conductor 207.

The operation of the structure is as follows:

As stated hereinbefore, this structure operates by departing from the normal withdrawn position, and advancing the tool rapidly into approximation with the work, then advancing the tool slowly to the work and then operating upon the work, intermittently withdrawing the tool from the work for clearing chips, etc., returning the tool rapidly toward the work, and again slowly feeding the tool for a further working operation which begins at a more advanced point. The intermittent withdrawal and return is continued, each successive slow feeding stage being shorter than the last preceding slow feeding stage. Finally, at a limit of feeding movement, the tool is again withdrawn and the parts are restored to the initial position ready for a further such cycle of movements.

At the beginning of such a cycle of movements, in the form of construction illustrated on the drawings, the drill and spindle are raised. The pin 122 is against stop 123 (Fig. 14), so that disk 118 is in an initial position. Cam piece 114 is engaged with arm 163 and the cam pawl 164 is free of the wear ring 119. Gear 90 is thus in its initial position. Cam 95 has its highest portion against the roller 98, so that the lever 100 and screw 104 are in their lowest position for closure of contact between roller 98 and cam 95. Switch HS is open and switch Sw may likewise be open. All relays are in de-energized (lower) positions in Fig. 20. All solenoids are de-energized, if switch Sw is open. Finger 46 is disengaged from the cogged wheel 43.

In described the operation, it may preliminarily be brought out that contacts 95—98 control the intermittent withdrawal of the tool from the work, the control by timing or distance being effected by the shape of cam 95 and the time of engagement of pad 161 with screw 104. Brush 136 in conjunction with sector 111 establishes the limit of the forward feeding, and thus determines the bottom of the hole drilled, for example. Brush 138 controls the limit of the reverse feeding in the withdrawal of the tool intermittently from the work. Relay FF controls the operation of the device during a cycle of movement, while intermittent withdrawals are being accomplished. Brush 113 controls the point of shifting from rapid forward to slow forward feeding movement. Brush 139 determines the position of the quill in the fully withdrawn position when the cycle is completed.

With the parts in the initial position described, the cycle of movement may be started when the article of work is beneath the drill, for example, by closing the hand switch Sw. The hand starting switch HS is then closed momentarily. A circuit is now established so that current flows from conductor 200a by conductor 202, switch Sw, conductor 203, conductor 206, conductor 207, coil 208, conductor 209, back to phase conductor 200c. Relay FF is thus energized and closes a circuit from conductor 203 by conductor 218, roller 98, cam 95, through the intermediate means to brush 105, by conductor 219, contacts at relay FF, conductor 220, contacts closed in relay RR when de-energized, conductor 221, coil 222 of forward relay FR, conductors 217 and 209, back to phase conductor 200c. A holding circuit is also established upon closure of relay FF from conductor 203, through brush 137, sector 111, brush 136, conductor 224, contacts of relay FF, conductor 224a, and thence through coil 208 and conductor 209, back to phase conductor 200c. This relay FF remains energized so long as both brushes 137 and 136 are engaged with sector 111. The energization of coil 222 closes forward relay FR and establishes a connection of the three phase conductors 200a, 200b, 200c with the motor conductors 201a, 201b, 201c, so that the motor M is set in motion for forward feeding.

As the motor M turns, it drives shaft 30, gear 31, gear 32, shaft 33, worm 35, worm gear 36, pivot pin 55, and (through the pins 58 and friction member 56) the upper shaft 42. The lower shaft 39 is free to turn as the finger 46 is not engaged with cogged wheel 43. The shaft 42 drives connecting shaft 22, and the driving shaft 70 of the tool unit, and thus the worm 72, worm wheel 73, sleeve 73a, bushing 77, pinion shaft 21, pinion 20, and the quill 16 is fed downward in Fig. 1. This gives a rapid forward feed. Also, the rotation of sleeve 73a turns gears 80, 82, 85 and thus gear 83 and cam 95, as well as shaft 87, gear 89 and gear 90, so that cam 95 and sector 111, 111a turn in unison with the quill movement. The sector 111 is considered as turning in a clockwise direction for the forward feeding (Figs. 14–19).

This rapid forward feeding movement continues, while the parts are turning, for example, from the position of Fig. 14 to that of Fig. 15. The brush 113 in hollow pin 112 ultimately encounters the ramp surface 128a of pin 128. At this moment a further circuit is closed from conductor 203, through brush 137, sector 111, pin 112, brush 113 (Fig. 8) for delivering current to pin 128 and thus to contact ring 135 and through brush 126 to conductor 213 (some of these parts being omitted in Fig. 20 for simplicity), and thence through coil 214 and by conductor 215 and motor conductor 201a to phase conductor 200b. Relay PR is thus energized and closes its bridge to establish a further circuit which may be traced from phase conductor 200b, through forward relay FR, motor conductor 201a, conductor 215, conductor 216, solenoid 51, conductors 217 and 209, back to phase conductor 200c. The solenoid 51 actuates finger 46 to engage it with the cogged wheel 43, and the slow feeding movement begins.

During this slow feeding movement, the shaft 39 is held against rotation. Shaft 33 and its worm 35 continue to turn the worm wheel 36 in the same direction as before, but the friction member 56 now slips with respect to the shoulder 57. Pin 55 is carried in rotation with worm wheel 36 and its pinion 54 operates as a planet pinion of an epicyclic gearing having a fixed sun gear 52 and a moving sun gear 53 with different numbers of teeth. Hence the upper shaft 42 is turned at a lesser speed than before, but in the same direction, and the quill 16 continues its downward movement but at a lesser rate, while the feed control devices continue to operate in unison therewith. The rapid feeding movement thus accomplished is that shown on Fig. 2 by the dotted line between points a and b. It will be noted that this rapid feeding movement terminates and the slow feeding movement begins before the tool encounters the top of the work. Thus there is no impact of the tool upon the work at a high rate of speed.

This slow forward feeding continues, from the point b to the point d. During this movement, the cam 95 has been turning in a counterclockwise direction so that a slight upward movement has been permitted lever 100 and its screw 104. During the initial part of the movement of gear 90, after slow feeding begins, the brush 113 rides up on the ramp surface 128a until finally the hollow pin 112 encounters the upstanding portion 128 of this pin and establishes a mechanical driving relationship between the gear 90 and the feed control disk 118, so that the two now turn at the same rate of speed. It will be understood that the distance of travel of the brush 113 along the ramp 128a before mechanical engagement occurs between pins 112 and 128 represents the distance of slow feeding movement of the drill before it encounters the work, i. e. the travel from point b to c. In turning, the cam piece 114 which is rigid with gear 90 ultimately leaves the arm 163, at the same time as the closing of the circuit (at brush 113) which controls the slow forward feeding (Fig. 15). Thus, when the mechanical driving connection between pins 112 and 128 begins (Fig. 16), the arm 163 has lowered the cam pawl 164 onto the friction disk 118 and its wear ring 119. Hence, when the turning movement of disk 118 begins, the arm 160 is carried therewith. This arm is in tight frictional relationship to the gear 90 and its spindle 91. The disk 118 and its wear ring turn freely past the retaining cam pawl 150 (Fig. 12). Thus, the arm 160 and its pad 161 are moving downwardly while the lever 100 and its screw 104 are moving upwardly. Ultimately the pad 161 encounters screw 104 and moves lever 100 to break the electrical contact between roller 98 and cam 95 (at point d, Fig. 2). The circuit is thus broken from conductor 203, through conductor 218, worm 98, cam 95, brush 105, conductor 219, contacts of relay FF, conductor 220, contacts of reverse relay RR, conductor 221, coil 222 of forward relay FR, and conductors 217 and 209. The forward relay FR is de-energized and moves to open position to cut off current from the motor M which then tends to come to a standstill. This general opening movement of forward relay FR, however, closes contacts so that a new circuit is now established from conductor 203, through brush 137, sector 111, brush 138, conductor 210, contacts of forward relay FR, conductor 211, coil 212 of reverse relay RR, and conductor 209 back to phase conductor 200c.

The reverse relay RR thus closes and the motor M is energized for movement in the opposite direction, is brought to a standstill from its forward movement, and begins its reverse movement. Reverse relay RR also opens the forward relay energizing circuit between conductors 220 and 221 to prevent energization of the two relays at the same time.

The opening of forward relay FR has opened the circuit from phase conductor 200b to motor conductor 201a, and thus de-energized coil 214 of relay PR and also the latch solenoid 51. The relay PR drops open and maintains the de-energization of solenoid 51. When the reverse relay RR closes, motor conductor 201b is connected to phase conductor 200a. Hence, the two ends of the branch circuit through conductors 213—215 are both connected to phase conductor 200a and no current flows through coil 214 to re-energize relay PR. Hence, solenoid 51 remains de-energized. Spring 46a operates upon de-energization of solenoid 51 to remove finger 46 from the cogged wheel 43 and hence the reverse movement of motor M produces a rapid reverse feeding or withdrawal.

As the motor turns in the reverse direction, the drive to the quill 16 and the gears 90 and 83 is the same as before, but these parts are moved in the opposite direction. The retaining pawl 150 prevents a retrograde movement of the wear ring 119 and the feed control disk 118 through the action of its spring 116. This ring therefore remains stationary and indicates the depth to which a drilling operation has been accomplished, i. e. a drilling to the depth $d^1$ in Fig. 2.

Also, the backward movement of cam 95 moves lever 100 downwardly at the same time as the return movement of the gear 90 and spindle 91 moves the arm 160 upwardly. Thus, the circuit is re-established from conductor 203 by conductor 218, roller 98, cam 95, brush 105, conductor 219, conductor 220, back to the contacts of reverse relay RR which are now open. Ultimately, sector 111 leaves brush 138 and thus opens the circuit through energizing coil 212. The reverse relay RR now opens again and the motor M is de-energized. In opening relay RR, however, the circuit through the forward relay coil 222 is closed again, the motor M is brought to a standstill of its reverse movement, and the rapid forward movement starts. During this rapid withdrawal movement, the drill has moved from the point d to point e on Fig. 2.

During the succeeding rapid feeding movement, the drill is advanced to point f at which brush 113 again encounters the ramp 128a and through the same circuits as before re-energizes solenoid 51 and thus causes the slow feeding movement.

During this withdrawal movement, however, the return of arm 160 has not initially occurred, owing to the engagement between cam pawl 164 and wear ring 119. When gear 90, however, turns until the cam piece 114 again engages the arm 163, this engagement is released and the arm 160 is now turned back to its stop 160a; a spring 161a (Fig. 7) connected to the end of the pivot for arm 163 and cam 164, and to the main housing may be employed to assist, if desired. As shown in Fig. 17, however, the feed control disk 118 and its stop pins 122 and 128 are not returned during this movement. Thus the travel of brush 113 until it encounters the arm 128 is successively greater for each intermittent forward feeding, so that the drill is brought to slow feeding movement, on each occasion, at a greater depth in the work, but on each occasion at substantially the same distance between the point of the drill and the work, as determined by the angular length of the ramp 128a.

Likewise, at each successive intermittent feeding, the screw 104 is raised a greater distance by its spring 102 as the cam 95 recedes above it, so that the engagement of pad 161 is occurring at a less distance or increment of slow feeding movement.

This sub-cycle of intermittent rapid feeding, slow feeding, and reverse feeding, continues so that at the successive intermittent feeding operations the drill is advanced into the work to the points designated as $d^1$, $d^2$, $d^3$, etc., the distance between points $d^2$ and $d^3$ (shown as lines in Fig. 2) being less than the distance between points $d^1$ and $d^2$, etc.

Finally, at the limit of feeding movement which has been established by the position of brush 136 in gear 133, and by the angular position of this gear, the sector 111 leaves brush 136 and thus opens the holding circuit which has been existing from conductor 203 through coil 208. Relay FF is de-energized, and thus the holding circuit is broken at the relay FF, as well as the intermittent motion control circuit through conductors 219, 220. The de-energization of relay FF, however, now closes a circuit from conductor 203, through coil 155, conductor 204, contacts of relay FF, conductor 205, and motor conductor 201c to energize coil 155, which pulls holding cam pawl 150 away from the wear ring 119, so that this ring and its disk 118 may turn backwardly under the action of spring 116 until stop pin 122 again encounters the fixed stop 123. Also, the de-energization of relay FF, by opening the circuit through conductors 219—220 has de-energized coil 222 of forward relay FR, so that this relay opens, and the motor M is de-energized. However, the relay FR then closes the reversing control circuit from conductor 203 through brush 137, sector 111, brush 138, conductor 210, contacts relay FR, conductor 211, coil 212, and conductor 209. Reverse relay RR closes to energize the motor M in the opposite direction and also to maintain the energization of solenoid 155. At the limit of the backward movement, brush 138 is released by sector 111, and the circuit through reverse relay coil 212 is open, so that the reverse relay RR moves to open position and de-energizes motor M. Since, however, the control circuit for energizing coil 222 of the forward relay FR is now open at relay FF, a further backward energization does not occur, and the motor continues to coast and turn sector 111. During this movement, sector extension 111a may encounter brush 139 and thus close a further circuit from conductor 203, through brush 137, sector 111, extension 111a, brush 139, conductor 223, conductor 220, contacts of relay RR, conductor 221, coil 222, and conductors 217 and 209, back to phase conductor 200c. The forward relay FR is energized, the motor is brought to a standstill and given a short forward movement. Immediately, however, sector extension 111a leaves brush 139 and opens this control circuit, so that the forward relay FR drops to open position before the motor M has regained speed.

All parts have now been restored to the initial position, and the device is ready for a new actuation upon closure of a circuit between conductors 206 and 207.

If for any reason the sector 111 is not brought to a standstill, owing to failure in the control system, it may turn in a counterclockwise direction from the position of Fig. 14, until it leaves the brush 137, which immediately opens the holding circuit for relay FF and of other feed control connections, and thus both relays FR and RR are open and the system comes to a standstill. That this has occurred will be immediately revealed by the position of dial 110 in conjunction with the index (Fig. 1).

Further, the operation of drilling is indicated by dial 110, as this dial turns through an angle corresponding to the linear movement of quill 16.

The brushes 136, 137, 138 and 139 are positioned in the gear 133 (Figs. 8 and 10) and control the limit of forward feeding movement (brush 136), the limit of return during intermittent withdrawal (brush 138), and the final withdrawal position upon the closing of the cycle (brush 139), while brush 137 is a general feed brush to sector 111. Hence, it is possible to adjust the feed without changing the length of the various strokes during a complete feeding cycle by merely rotating the gear 133, which may be accomplished by the external knob 141 in the manner described above. This is particularly valuable, as it is possible to remove the drill 19, grind it, replace it, and then reset the entire structure for accurate operation without any change of the position of dogs, brushes, or like elements.

In order to provide a self-contained structure, it is preferred, as shown in Fig. 7, to provide a terminal plate 300 at which the various conductors from the control nest, from brush 126, from roller 98, and from brush 105 may be connected.

It will be understood that while this mechanism and apparatus has been shown in conjunction with a drilling tool, it is applicable to employment with other devices in which such a type of feeding is valuable, and that it may be employed in many ways within the scope of the appended claims.

Having thus described the invention, what I claim as new and desire to secure by Letters Patent, is:

1. In a drilling apparatus of the class described, a frame, a drill spindle movable relative to the frame, means for reciprocating the spindle, a contact cam moved with the spindle, a lever having a contact cooperative with the surface of said cam, a control member advanced in unison with said spindle, an element actuated by said control member for moving said lever to separate said contact and said cam, means for normally preventing return movement of the control member, and circuit devices including said contact and cam and means for controlling said reciprocating means for effecting reciprocating movements thereof, said cam and control members cooperating to vary the required movement of said element before said lever is caused to effect said separation.

2. In a drilling apparatus of the class described, a frame, a drill spindle movable relative to the frame, means for reciprocating the spindle, a first control member moved in unison with said spindle, a second control member, first interengaging means on said first control member and second control member whereby the first control member moves said second control member in one direction, means for normally preventing retrograde movement of said second control member, an arm, second interengaging means on said arm and second control member whereby the second control member during its own movement moves said arm, means moved with said first control for releasing said second interengaging means during the movement of said first control member in the opposite direction, means for returning said arm, and devices controlled by said first control member and arm for controlling said reciprocating means.

3. An apparatus as in claim 2 including devices controlled by said first interengaging means, also for controlling said reciprocating means.

4. An apparatus as in claim 2, including a contact cam also moved in unison with said member, a lever having a contact cooperating with said cam, said arm engaging said lever to separate said contact from said cam after a movement of said arm determined by the shape and position of the cam.

5. In a drilling apparatus of the class described, a frame, a drill spindle movable relative to the frame, means for reciprocating the spindle, a contact sector rotated in unison with the movement of said spindle, a control member, first interengaging means on said sector and control member whereby the sector moves said control member in one direction, means for normally preventing retrograde movement of said control member, an arm, second interengaging means on said arm and control member whereby the control member during its own movement moves said arm, means moved with said sector for releasing said second interengaging means during the movement of said sector in the other direction, means for returning said arm, a contact moved by said arm upon movement in said one direction, a cooperating contact, further contacts cooperative with said sector, and circuit means including said contacts for controlling said reciprocating means.

6. An apparatus as in claim 5, in which said sector has a portion which at the end of a predetermined movement of said spindle escapes from one of said further contacts, and said circuit means extending through said one further contact includes devices for releasing said normal preventing means, together with means for returning said control member to initial position.

7. An apparatus as in claim 5, including a movable member providing an insulating support for at least a portion of said further contacts, whereby movement of said movable spindle will determine the positions of said member relative to said frame at which said moving means is controlled without change of the distances of movements of said spindle thus controlled.

8. In a drilling apparatus of the class described, a frame, a drill spindle movable relative to the frame, means for reciprocating the spindle, a gear and a gear train for rotating said gear in unison with the spindle, a contact sector on said gear, pin means carried by said gear in electrical connection with said sector, a control member coaxial with said gear, a lug on said control member in the path of movement of said pin means and including a portion engaged by said pin means for driving said control member, and a contact portion engaged by said pin means before the driving begins, contact means actuated by said control member after a movement thereof, means for holding said control member against return movement, means controlled by the gear for returning the contact means with the gear, and a contact for supplying current to said sector, limit contacts disengaged by said sector upon predetermined movements of said spindle in the opposite direction, and circuit means including said contacts, sector, pin, contact portion and contact means for controlling said reciprocating means, whereby a rapid forward movement occurs until said pin engages said contact portion, thereafter a slow forward movement until said contact means is actuated, and then a rapid return movement until said sector leaves said limit contact, in succession, each forward movement being to a greater distance as said control member carries said lug forward.

9. In a drilling apparatus of the class described, a frame, a drill spindle movable relative to the frame, means for reciprocating the spindle, a gear and a gear train for rotating said gear in unison with the spindle, a contact sector on said gear, pin means carried by said gear in electrical connection with said sector, a control member coaxial with said gear, a lug on said control member in the path of movement of said pin means and including a portion engaged by said pin means for driving said control member, and a contact portion engaged by said pin means before the driving begins, contact means actuated by said control member after a movement thereof, means for holding said control member against return movement, means controlled by the gear for returning the contact means with the gear, and a contact for supplying current to said sector, a limit contact disengaged by said sector upon a predetermined movement of said spindle in the other direction, and circuit means including said contact, sector, pin, contact portion and contact means for controlling said reciprocating means, whereby a rapid forward movement occurs until said pin engages said contact portion, thereafter a slow forward movement until said contact means is actuated, and then a rapid return movement until said sector leaves said limit contact, in succession, each forward movement being to a greater distance as said control member carries said lug forward.

10. A drill having a frame including a holder for a piece of work, a rotating spindle movable relative to the frame and a tool operating by rotation of the spindle, and means for feeding the spindle back and forth, said feeding means including a feed determining device moved in unison with the spindle, a feed limiting device advanced when the spindle is moved forward, means for moving said feed devices toward one another during the forward movement of the spindle, means for holding the limiting device against return movement when the spindle is moved backward, and means including cooperating devices actuated with the said devices for controlling said feeding means to produce successively rapid forward movements, each followed by a slow forward movement and a return movement, said cooperating devices comprising interengaging abutments.

11. In a drilling apparatus of the class described, a frame, a drill spindle movable relative to the frame, means for reciprocating the drill spindle, and means for controlling said reciprocating means whereby said drill spindle is alternately moved forward and thereafter returned in cycles, each said forward movement being greater than the last succeeding forward movement by a successively decreasing amount; said controlling means including two abutment structures and means for moving the same with said drill spindle and differentially with respect to one another to effect engagement of the same, devices operatively controlled upon engagement of the structures to cause said controlling means to terminate the forward movement and initiate a return movement, one said abutment structure comprising a single adjustable element engaged by the other said abutment structure to determine the amounts of all said forward movements, and devices included in said abutment structures and reciprocating means for causing said adjustable element to engage the other said abutment structure at a different position of said spindle for each forward movement thereof and with each forward movement greater than the last succeeding forward movement by a successively decreasing amount.

12. In a drilling apparatus of the class described, a frame, a drill spindle movable relative to the frame, means for reciprocating the spindle, control members moved in unison with said spindle, and devices selectively engaged by said control members for controlling said reciprocating means whereby said spindle is alternately moved forward and thereafter returned, each said forward movement being greater than the last succeeding forward movement by a successively decreasing amount; said controlling means including two abutment structures and means for moving the same with said spindle and differentially with respect to one another to effect engagement of the same, devices operatively controlled upon engagement of the structures to cause said controlling means to terminate the forward movement and initiate a return movement, one said abutment structure comprising a single adjustable element engaged by the other said abutment structure to determine the amounts of all said forward movements, and devices included in said abutment structures and reciprocating means for causing said adjustable element to engage the other said abutment structure at a different position of said spindle for each forward movement thereof and with each forward movement greater than the last succeeding forward movement by a successively decreasing amount.

13. In a drilling apparatus of the class described, a frame, a drill spindle movable relative to the frame, means for reciprocating the spindle by successive rapid forward movements each followed by a slow forward movement and a return movement, a traveling element carried continually forward by the spindle during each successive slow feed movement for the purpose of governing the point of each succeeding shift from rapid forward to slow forward movement, means for detaining the traveling element in its successively moved positions during the return movement of the spindle, an abutment movable with said spindle and engaged by the traveling element to determine the amount of each forward movement, control means operatively controlled by the engagement of the traveling element and abutment for causing said producing means to effect a return movement, and means for releasing said detaining means and for automatically returning said traveling element to the starting position during the final return movement of the spindle.

14. An apparatus as in claim 13, in which the abutment comprises a reciprocable element which is fed forward predeterminable distances by and with each advance of the traveling element for the purpose of controlling said control means for shifting from the slow forward feed movement to the return movement, and a contact element included in said traveling element and operated upon contact of the reciprocable element with said traveling element.

15. In a drilling apparatus of the class described, a frame, a drill spindle movable relative to the frame, electrically controlled means for reciprocating the spindle by successive rapid forward movements each followed by a slow feed movement and a return movement, a traveling element containing a limit contact carried continually forward with the spindle during each successive slow feed movement for the purpose of governing the point of each succeeding shift from rapid forward to slow forward movement, means for detaining the traveling element in its successively advanced positions, an abutment moved with and toward said traveling element during the forward movement and operating upon engagement therewith to actuate said limit contact and moved back with said spindle during the return movement, and means controlled by said limit contact for automatically returning said traveling element to the starting position during the final return movement of the spindle.

16. In a drilling apparatus of the class described, a frame, a drill spindle movable relative to the frame, and means for reciprocating the spindle to feed the tool to the work; said means including a reversible source of power, feed transmitting elements connecting the source with the spindle and including a device for changing the speed ratio of transmission, and feed control devices including parts actuated with said spindle, said parts including two abutments which upon engagement actuate said controlled reversing means, means for moving the abutments toward one another during the forward feeding of the spindle and operating for successively advancing one said abutment to a greater distance at each cycle of movement by an increment of distance which is less than the preceding increment, and means controlled by said parts for reversing said source after a return movement of the spindle and also effective for actuating said speed changing device for producing cycles of movement each comprising a rapid forward movement followed by a slow forward movement and a return movement.

17. An apparatus as in claim 16 in which the said controlled reversing means includes devices operating to terminate each said rapid forward movement short of the end of the prior slow forward movement.

18. An apparatus as in claim 16 in which said controlled reversing means includes devices operating to terminate each said rapid forward movement short of the end of the prior slow forward movement, and means operated after a forward movement of predetermined amount for causing said reciprocating means to produce a final return movement and for detaining the spindle in withdrawn position.

19. An apparatus as in claim 16 in which the said controlled reversing means includes devices operating to terminate each said rapid forward movement short of the end of the prior slow forward movement, and means operated after a forward movement of predetermined amount for causing said reciprocating means to produce a final return movement and for detaining the spindle in withdrawn position, and in which the several said means include two withdrawal limit devices, one said device operating during the intermittent feeding to cause the initiation of successive cycles of forward and return movements, and the other said device is brought by said means into operation only at the completion of the whole operation upon said forward movement of predetermined amount for the purpose of detaining the spindle at a fully withdrawn position and following a return movement greater than the return movements during the phases of intermittent operation.

EDWARD JOSLIN KINGSBURY.